(12) United States Patent
Taylor

(10) Patent No.: US 8,844,415 B2
(45) Date of Patent: Sep. 30, 2014

(54) TABLE SAW DUST COVER

(75) Inventor: Brian Taylor, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 284 days.

(21) Appl. No.: 13/336,045

(22) Filed: Dec. 23, 2011

(65) Prior Publication Data

US 2013/0160625 A1    Jun. 27, 2013

(51) Int. Cl.
B23D 59/00    (2006.01)

(52) U.S. Cl.
USPC .............................. 83/99; 83/100; 83/477.2

(58) Field of Classification Search
USPC ........ 83/99, 100, 471.3, 477.2, 168, 169, 490
See application file for complete search history.

(56) References Cited

U.S. PATENT DOCUMENTS

| | | | |
|---|---|---|---|
| 2,044,481 A | | 6/1936 | Manley et al. |
| 4,063,478 A | * | 12/1977 | Stuy ................................ 83/100 |
| 4,255,995 A | | 3/1981 | Connor |
| 4,721,023 A | * | 1/1988 | Bartlett et al. .................. 83/100 |
| 4,962,685 A | * | 10/1990 | Hagstrom ........................ 83/397 |
| 5,123,317 A | * | 6/1992 | Barnes et al. ..................... 83/98 |
| 6,009,782 A | * | 1/2000 | Tajima et al. ..................... 83/99 |
| 6,370,997 B1 | * | 4/2002 | Rugen et al. .................... 83/100 |
| 8,210,076 B2 | * | 7/2012 | Oberheim ......................... 83/58 |
| 8,245,612 B2 | * | 8/2012 | Chung et al. ..................... 83/58 |
| 8,291,801 B2 | * | 10/2012 | Chung et al. ................. 83/477.2 |
| 8,522,658 B2 | * | 9/2013 | Frolov ............................ 83/473 |
| 8,578,825 B2 | * | 11/2013 | Oberheim ......................... 83/58 |
| 2006/0272464 A1 | * | 12/2006 | Chen ................................ 83/100 |
| 2008/0289467 A1 | * | 11/2008 | Skillings et al. ................ 83/169 |
| 2012/0036972 A1 | * | 2/2012 | Frolov ............................ 83/168 |
| 2012/0036976 A1 | * | 2/2012 | Frolov ............................ 83/473 |
| 2012/0090440 A1 | * | 4/2012 | Koegel et al. ................... 83/100 |
| 2013/0104714 A1 | * | 5/2013 | Dammertz et al. ............... 83/98 |
| 2013/0160623 A1 | * | 6/2013 | Taylor ............................ 83/147 |

FOREIGN PATENT DOCUMENTS

| | | |
|---|---|---|
| EP | 0 830 912 A2 | 3/1998 |
| EP | 1 712 317 A2 | 10/2006 |

OTHER PUBLICATIONS

International Search Report and Written Opinion in corresponding PCT application (i.e., PCT/US2012/071538), mailed Jul. 17, 2013 (17 pages).
Partial International Search Report in corresponding PCT Application (i.e., PCT/US2012/071538) mailed Mar. 27, 2013 (6 pages).

* cited by examiner

Primary Examiner — Omar Flores Sanchez
(74) Attorney, Agent, or Firm — Maginot, Moore & Beck

(57) ABSTRACT

A power tool includes a table structure defining a blade slot, a frame supporting the table structure, a blade assembly mounted within the frame, and a dust cover assembly. The blade assembly includes a blade positioned within the blade slot, a motor assembly to rotate the blade, and a carriage assembly supporting the motor assembly and pivotably mounted to adjust the angular orientation of the blade relative to the table structure. The carriage assembly includes a cover arranged to define a gap between an upper edge of the cover and the underside of the table structure. The dust cover assembly is mounted between the carriage assembly and the table structure to substantially cover the gap at all angular orientations of the blade relative to the table structure. The dust cover assembly is mounted for relative movement relative to at least one of said carriage assembly and said table structure.

12 Claims, 10 Drawing Sheets

TABLE SAW DUST COVER

TECHNICAL FIELD

The present disclosure relates generally to power saws, and particularly to power saws having a debris collection system.

BACKGROUND

One type of cutting tool is a power saw that includes an electrical motor mounted below a work surface. Users frequently refer to this type of power saw as a table saw, because the work surface resembles a tabletop. The table has an opening that allows a portion of the cutting tool, such as a saw blade, to extend above the surface of the table. The blade, which is rotatably connected to the electrical motor, is movable relative to the surface of the table to enable a user of the table to make cuts of a particular depth or angle. For example, to adjust the height of the blade, a user may position a workpiece adjacent to the blade and then adjust the height of the blade such that the apex of the blade extends just above the thickest portion of the workpiece. To cut the workpiece, a user positions the workpiece on the table, such that a line representing the cutting path of the blade is aligned with a region of the workpiece to be cut, energizes the motor to rotate the blade, and moves the workpiece toward the rotating blade. As the blade cuts through the workpiece, it generates dust, chips, and other workpiece debris, which may be collected by a debris collection system.

Table saw debris collection systems, commonly referred to as dust collectors, direct the workpiece debris into a collection receptacle such as a porous bag or other suitable container. Additionally or alternatively, an external negative pressure source, such as a vacuum may be configured to draw the debris from a debris exit port of the table saw into a container. Some users, however, may desire a table saw having a dust collector, which functions effectively without a separate negative pressure source. Accordingly, further developments in the area of table saw dust collection systems are desirable.

SUMMARY

A power tool is provided that comprises a table structure including a work surface and defining a blade slot, a frame supporting the table structure, and a blade assembly including a blade operably positioned within the blade slot and a motor assembly coupled to the blade to operate the blade. The power tool further comprises a carriage assembly supporting the motor assembly and pivotably mounted relative to the table structure to adjust the angular orientation of the blade relative to the table structure. The carriage assembly defines a chamber within which the blade operates and a discharge chute for discharge of dust and debris during operation of the blade. A cover of the carriage assembly is arranged to define a gap between an upper edge of the cover and the underside of the table structure in which the size of the gap varies as the carriage assembly pivots relative to the table structure. In one feature disclosed herein, the power tool is further provided with a dust cover assembly mounted between the carriage assembly and the table structure and sized to substantially cover the gap at all angular orientations of the blade relative to the table structure. In one aspect, the dust cover assembly is mounted for movement relative to at least one of the carriage assembly and the table structure.

In another feature disclosed herein, a power tool comprises a table structure including a work surface and defining a blade slot, a frame supporting the table structure, a blade assembly including a blade operably positioned within the blade slot and a motor assembly coupled to the blade to operate the blade; and a carriage assembly supporting the motor assembly. The carriage assembly defines a chamber within which the blade operates and a discharge chute for discharge of dust and debris during operation of the blade, and further defines a channel with the motor assembly supported therein for translation between a lowermost and an uppermost position within the channel to vary the prominence of the blade relative to the table structure. In one aspect, the power tool is further provided with a dust cover assembly including a flexible skirt fastened at one end thereof to the motor assembly and sized to substantially cover the channel when the motor assembly is in the lowermost position within the channel. The dust cover assembly further includes a tensioning mechanism connected to an opposite end of the flexible skirt and configured to maintain the flexible skirt in tension as the motor assembly moves between the lowermost and the uppermost position within the channel.

BRIEF DESCRIPTION OF THE FIGURES

Features of the present disclosure should become apparent to those of ordinary skill in the art to which this device pertains from the following description with reference to the figures, in which.

DETAILED DESCRIPTION

For the purpose of promoting an understanding of the principles of the device described herein, reference is made to the embodiment(s) illustrated in the figures and described in the following written specification. It is understood that no limitation to the scope of the device is thereby intended. It is further understood that the device includes any alterations and modifications to the illustrated embodiment(s) and includes further applications of the principles of the device as would normally occur to one of ordinary skill in the art to which this device pertains.

Figure 1:
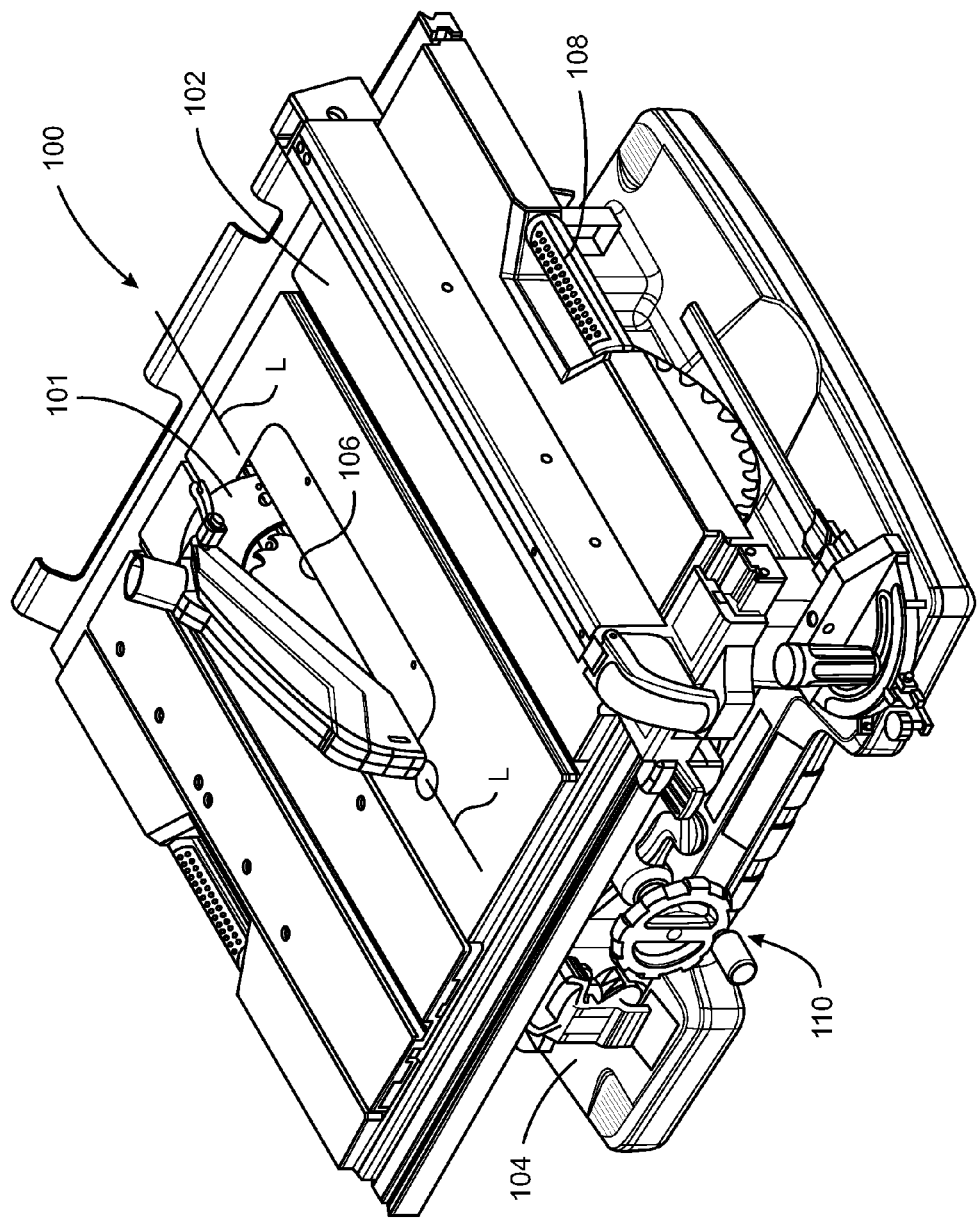
FIG. 1 is a perspective view of a table saw.
Figure 2:
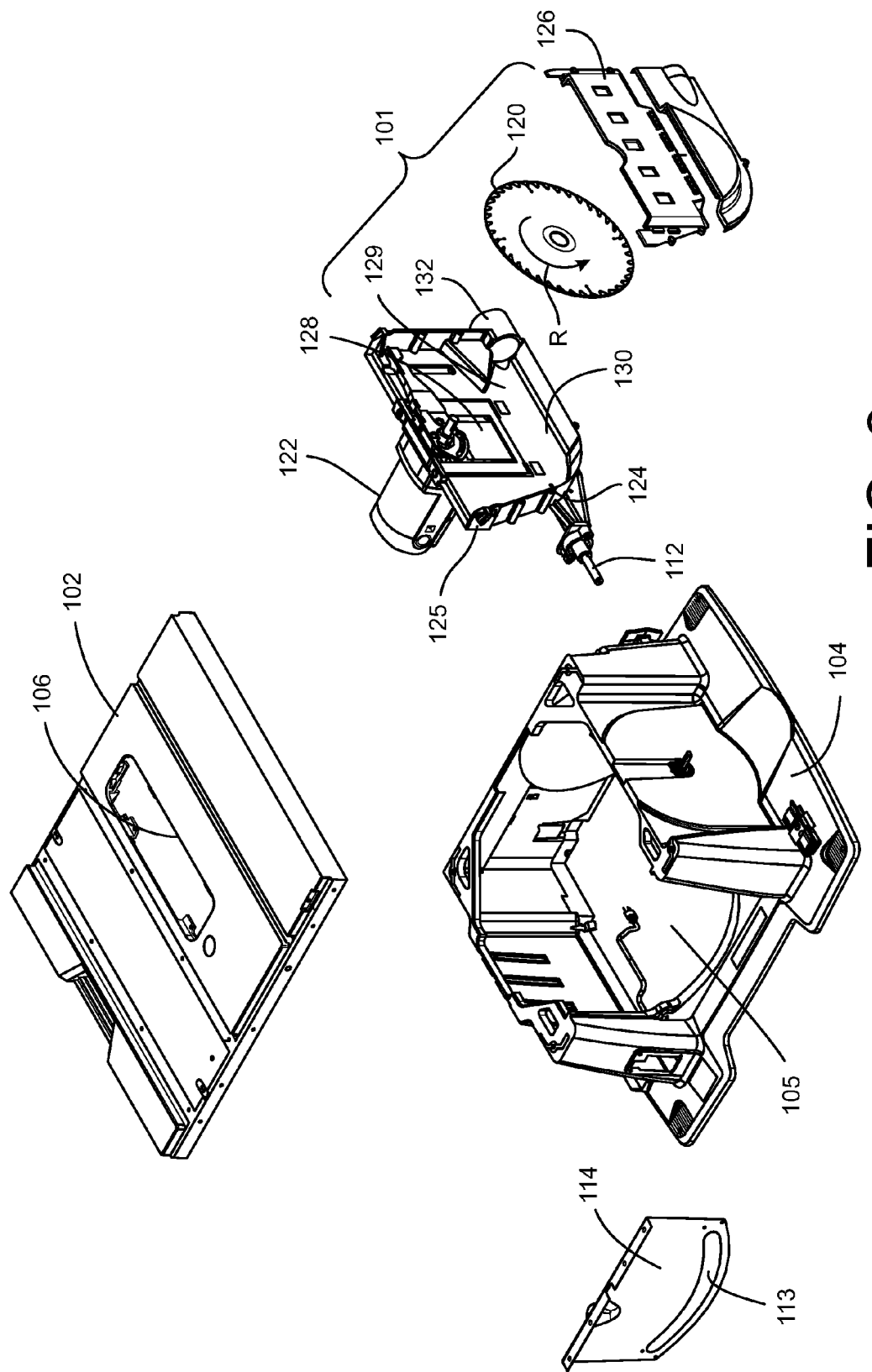
FIG. 2 is an exploded view of certain components of the table saw of FIG. 1.

As shown in FIGS. 1 and 2, a power tool in the form of a table saw 100 includes a blade assembly 101, a table structure 102 and a frame 104. The table 102 includes an opening or slot 106 through which a top portion of the blade assembly 101 extends. The table 102 has a generally planar upper surface, which may be referred to as a work surface. The frame 104 is connected to a bottom portion of the table 102 and is configured to define an internal space 105 in which the bottom portion of the blade assembly 101 is positioned. In the embodiment of FIG. 1, the table structure 102 and frame 104 may be formed from sheet metal, plastic, aluminum, composite materials, or the like. The table 102 and frame 104 may include handles, such as handle 108, which enable a user to carry the table saw 100 conveniently.

In certain embodiments, the blade assembly 101 has a fixed position along the longitudinal axis L of the table 102 or along the length of the slot 106. In other embodiments, the blade assembly 101 may be mounted to a slide assembly (not shown) that enables the blade assembly longitudinally relative to the table 102, commonly referred to as a "push-pull" saw.

The blade assembly 101 of the table saw 100 includes an adjustment mechanism 110 for adjusting the angular and vertical position of the blade. The mechanism 110 is adapted to permit rotation of the blade assembly 101 about the longitudinal axis L so that the blade can make an oblique cut in the workpiece. The mechanism may be further adapted to raise and lower the cutting blade relative to the table 102 to adjust the depth of the cut into the workpiece.

As shown in FIG. 2, the blade assembly 101 generally includes a blade 120, an electrical motor assembly 122, and a carriage assembly 124 including a cover assembly 126. The carriage assembly 124 includes a pivot mount 125 that is pivotably mounted to the carriage 104 or to the underside of the table 102 to permit pivoting of the blade assembly, and thus the blade 120, about the longitudinal axis L (FIG. 1). The motor assembly 122 is supported within a channel 128 in the carriage assembly configured to allow the motor assembly, and therefore the blade 120, to move up and down relative to the table 102 and slot 106. The blade 120 may be configured for rotary or reciprocating motion, depending upon the nature of the table saw 100, and the motor assembly 122 is configured to drive the blade in the rotary or reciprocating motion.

The adjustment mechanism 110 incorporates a mechanism for controlled pivoting of the carriage assembly 124 relative to the table 102, and for controlled up and down movement of the motor assembly 122 relative to the table, which ultimately provides for controlled positioning of the cutting blade 120. It can be appreciated that a variety of adjustment mechanisms may be utilized to provide the angular and up-down adjustments for the blade 120. For instance, a lead screw mechanism may be provided to move the motor assembly 122, and thus the blade 120, up and down relative to the carriage assembly 124 and thus relative to the table 102 and work surface. The angular adjustment mechanism may incorporate a shaft 112 engaged within a curved slot 113 in a side wall 114 of the frame 104. The shaft 112 may form part of a gear mechanism for driving the height adjustment lead screw. Other mechanisms are contemplated provided they are at least capable of adjusting the angle of the blade 120 relative to the table 102 and slot 106.

The carriage assembly 124 and cover assembly 126 define a chamber 129 within which the blade 120 rotates when it is mounted to the motor assembly 122. The chamber 129 includes a discharge chute 130 defined at a lower portion of the chamber to direct dust and debris to an outlet 132. The chamber and discharge chute are configured to redirect dust and debris propelled by the rotation of the blade 120 in the direction R. Rotation of the blade can generate airflow that helps to further propel the debris along the discharge chute 130 to the outlet. It is also contemplated that suction may be provided at the outlet 132 to assist in clearing the dust and debris from within the chamber 129. The cover assembly 126 may include a main cover 126a and a lower cover 126b that is hinged to the main cover so that the lower cover can be opened to remove dust and debris from the chamber 129.

The carriage assembly 124 and more particularly the chamber 129 and chute 130, are configured to contain and convey the majority of the dust and debris when the blade 120 is operated. However, in order to accommodate the angular adjustment feature, the carriage assembly and cover cannot be mounted directly to the underside of the table 102 to completely seal the slot 106 through which the blade passes. In other words, the need to pivot the motor assembly 122 leads to gaps between the chamber 129 and the table 102. The dust generated by the blade 120 is often very fine and the rotation of the blade naturally generates an airflow that tends to blow a certain amount of dust through any gaps that may exist.

Figure 3:
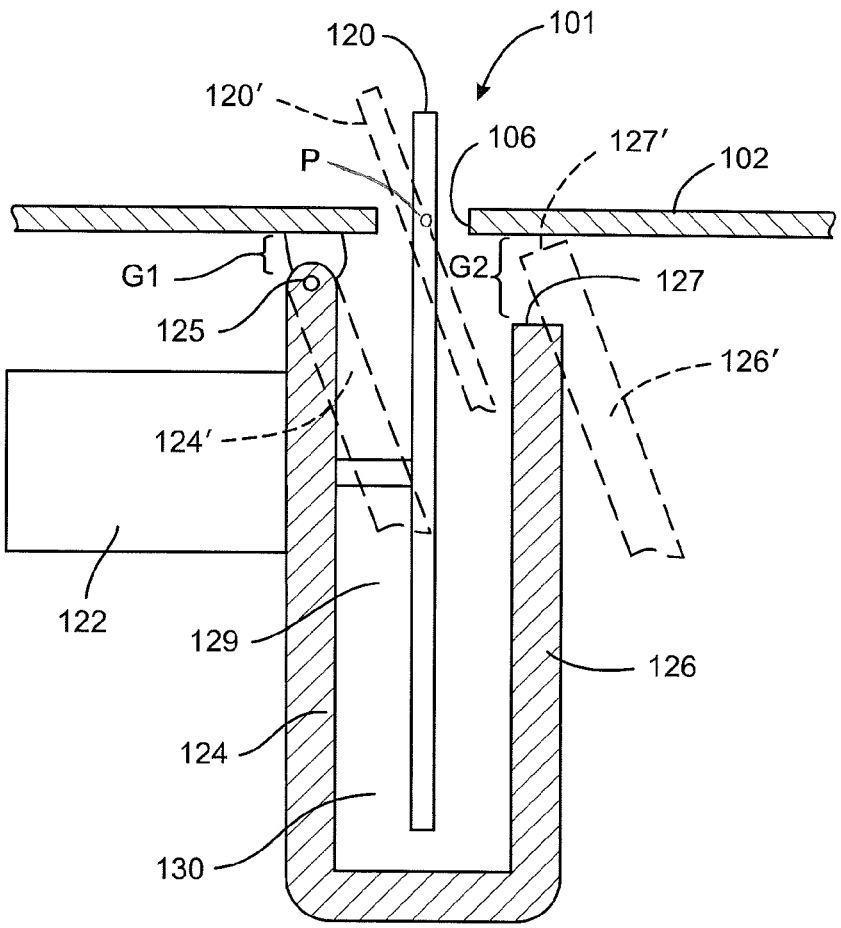
FIG. 3 is a side representation of the blade assembly of the table saw of FIGS. 1-2.
Figure 4:
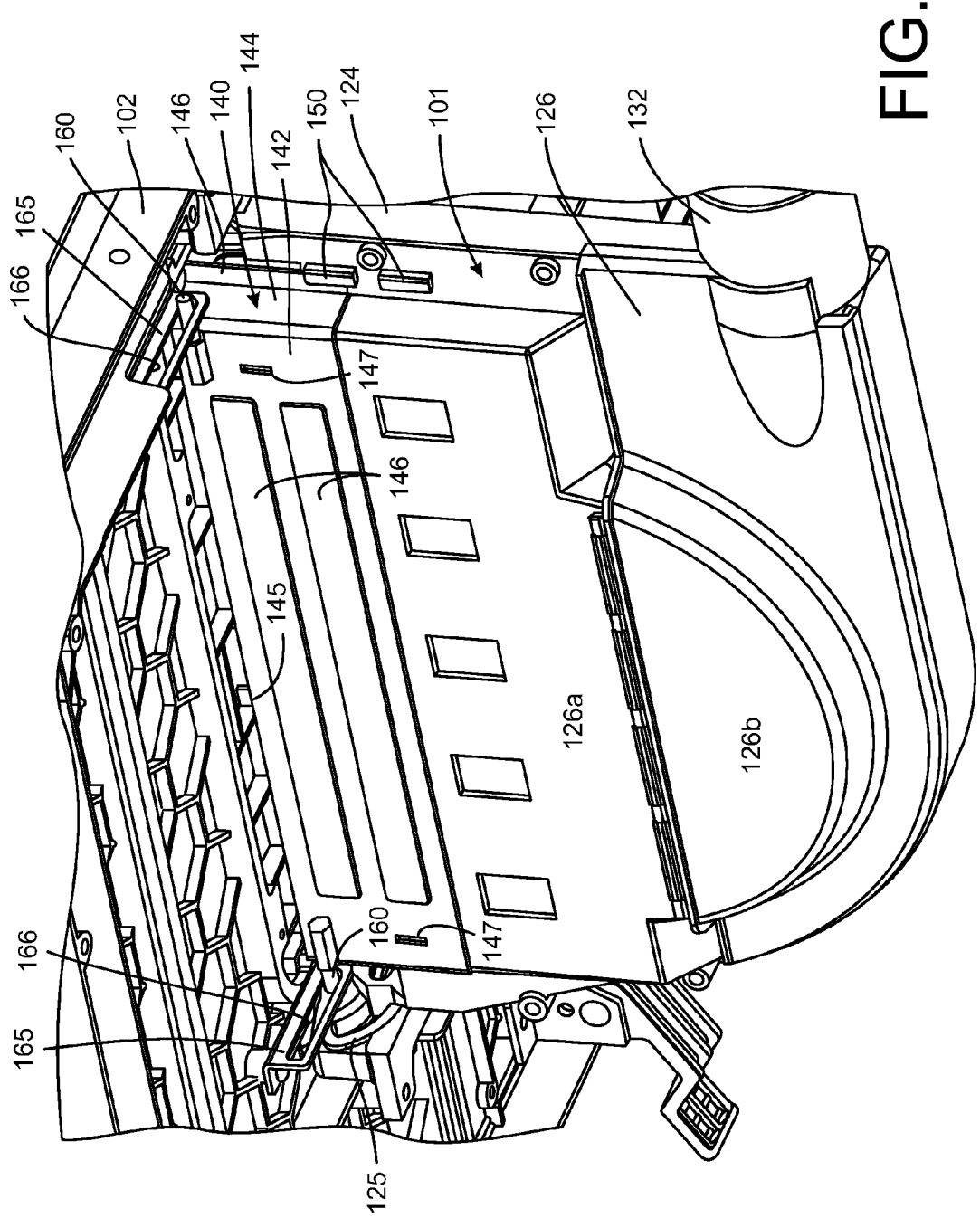
FIG. 4 is a perspective view of a dust cover assembly according to one disclosed embodiment for use with a table saw, such as the saw of FIG. 1.

Thus, as schematically depicted in FIG. 3, the carriage assembly 124 is pivotably mounted to the table 102 at pivot mount 125, leaving a gap G1. The pivot mount 125 may incorporate a curved slot, as illustrated in FIG. 4, with a post projecting from the carriage assembly that is aligned with the blade, although other pivot mounts are contemplated that allow the blade to pivot about a point P in the plane of the table 102. For clarity, the pivot mount 125 has been depicted in FIGS. 3, 5 and 7 as a simple hinge at one side of the blade, rather than centered on the blade as shown in FIG. 4. While the pivot mount 125 can be configured as compact as possible, a gap G1 will still exist between the upper edge of the carriage assembly 124 and the underside of the table 102. Since the blade assembly 101 is pivoted relative to the table 102, a gap G2 must be provided between the upper edge 127 of the cover 126 and the underside of the table. When the blade assembly is pivoted, as depicted in dashed lines in FIG. 3, the upper edge 127' of the cover 126' may contact the table 102. Without the gap G2 the blade assembly 101 could not pivot because the upper edge 127 would contact the table 102 just as the cover 126 began to move. It can be appreciated that the size of the gap G2 provides a clear avenue for dust and debris to escape the chamber 129 and discharge chute 130.

According to one aspect of the disclosed embodiments, a dust cover assembly 140 is provided that is suspended from the underside of the table 102, as shown in FIG. 4, and is adapted to move with the blade assembly 101, and particularly the cover 126, as the blade assembly pivots. The dust cover assembly 140 includes a cover plate 142 that is configured to closely conform to the shape of the cover 126, and particularly the upper portion of the cover at the edge 127, thus providing a close sliding fit between the cover and cover plate. The cover plate 142 is sized to span the gap G2 and at least partially overlap the upper portion of the cover 126 when the blade assembly 101 is in its vertical, un-pivoted position, as shown in FIG. 4. The dust cover assembly 140 may be configured so that the upper edge 145 contacts the underside of the table 102, although a very slight gap may be preferable because the cover 142 translates during pivoting of the blade assembly 101, as explained below. This residual gap is significantly smaller than the gap G2 and highly effective at preventing the passage of dust and debris.

The cover plate 142 is configured to closely conform to the outside of the cover 126, preferably in a close sliding fit. This close fit helps prevent passage of dust between the cover plate 142 and cover 126. The cover plate 142 and cover 126 are provided with guide features that permit relative movement between the cover plate and cover while constraining the movement of the cover plate. Thus, in one embodiment, the cover plate 142 is provided with flanges 144 on the opposite sides of the plate, with the flanges also conforming to the outer configuration of the cover 126. The flanges terminate in a guide strip 146 that is configured to slide within guide rails 150 provided on the cover 126, as illustrated in FIG. 4.

It can be appreciated that the flanges 144 and guide rails 150 allow for relative translation between the cover plate 142 and the cover 126. In order to retain the upper edge 145 of the cover plate 142 immediately adjacent the table 102 at all positions of the blade assembly, the cover plate is constrained to the table 102 at the upper edge. In one embodiment, the cover plate 142 is provided with laterally projecting pins 160 that project through slots 166 in corresponding brackets 165. The brackets 165 are fastened to the underside of the table structure and the slots 166 extend generally parallel to the table structure. The pins 160 and slots 166 are configured so that the pins can both slide and rotate within the slot. The slotted brackets 165 and the guide rails 150 thus constrain the manner of movement of the cover plate 142 so that it is always in intimate contact with the blade assembly 101 and in close proximity to the table 102 regardless of where the blade assembly is oriented.

Figure 5A:
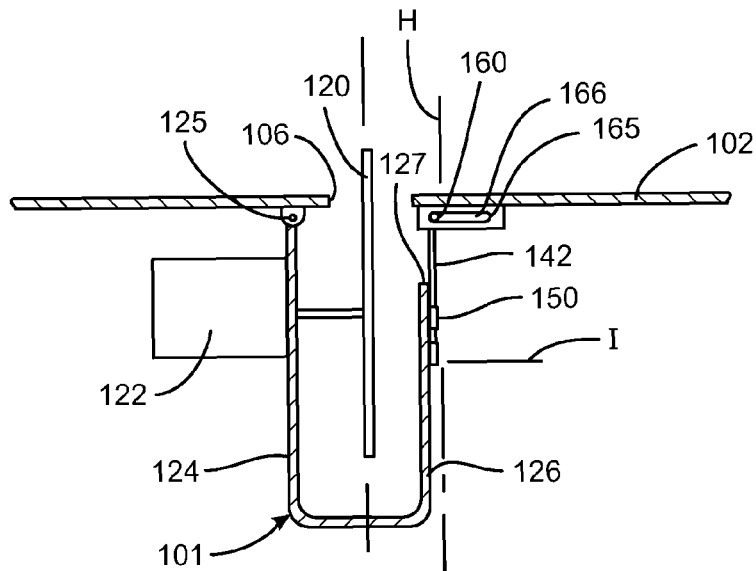
FIGS. 5A-C are diagrams of sequential positions of the blade assembly and dust cover assembly during pivoting of the blade assembly.
Figure 5B:
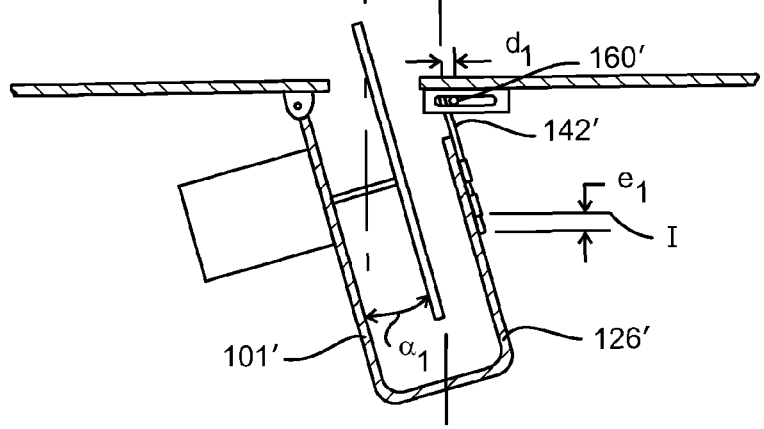
Figure 5C:
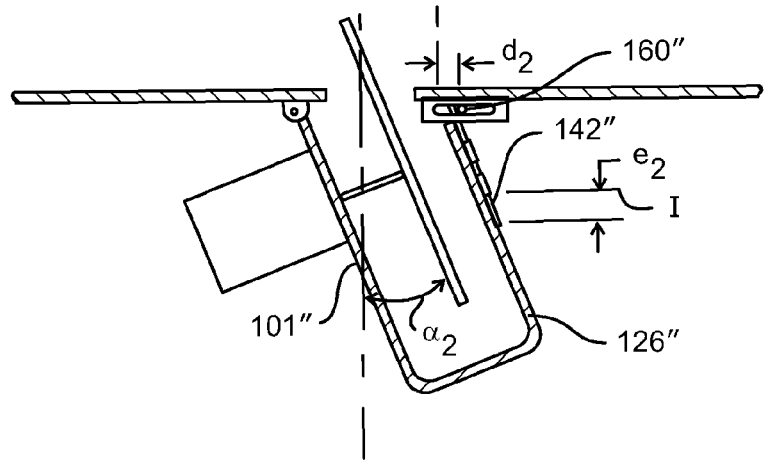

The movement of the blade assembly 101 and the dust cover assembly 140 is illustrated in FIGS. 5A-C. The starting position of the blade assembly 101 is shown in FIG. 5A with the blade 120 perpendicular to the table 102. In this position, the lateral pins 160 are situated at one end of the slots 166 in brackets 165, signified by the line H. The flanges 144 of the dust cover plate 142 are engaged within the guide rails 150, with the lower edge of the dust cover plate at an initial position signified by the line I in FIG. 5A.

When the blade assembly 101' is pivoted so that the cutting blade is at a first angular position α1 relative to the vertical line as diagrammed in FIG. 5B, the cover 126' naturally pivots closer to the table 102. Thus, the space between the upper edge 127 (FIG. 3) of the cover 126' is reduced, which means that the lower edge of the dust cover plate 142' is oriented at a distance e1 below the original position I. It can be appreciated that since the dust cover plate 142' is constrained by the guide rails 150 the dust cover plate pivots with the blade assembly 101'. Since the upper end of the dust cover plate is constrained within the slotted plates 165 the dust cover plate must slide relative to the cover 126'. Moreover, since the dust cover plate is constrained relative to the cover 126' the lateral pins 160' translate within the slot 166 of the mounting plate 165 by a distance d1 from the original position H of the posts. As the blade assembly 101" is pivoted further to the angle α2 relative to the vertical line shown in FIG. 5C, the lower end of the dust cover plate extends a distance e2 from the original position I and the lateral posts translate to a distance d2 (which is greater than the distance d1) from the original position H of the pins.

It can be appreciated from the sequence depicted in FIGS. 5A-C that the dust cover plate 142 always covers the gap G2 between the upper edge 127 of the cover 126 and the underside of the table 102. The manner in which the dust cover plate is supported and constrained allows the dust cover plate to fill this gap even as the gap decreases during pivoting of the blade assembly 101 and even as the upper edge 127 of the cover 126 translates during this pivoting. Moreover, the planar configuration of the cover plate 142 in combination with the guide rails 150 ensure that the cover plate always moves in the plane of the cover 126 to minimize any pockets that might collect dust at the upper edge 127 of the cover 126.

The dust cover plate 142 may be formed of metal, plastic or other materials suitable for use in the table saw 100. In one embodiment, the dust cover plate is formed from a metal blank, such as stainless steel or aluminum, stamped to define the flanges 144 and guide strips 146. The lateral pins 160 may be fastened to the dust cover plate in a conventional manner, such as by adhering or welding the posts to the plate. Alternatively, the dust cover plate 142 may be molded from plastic or other moldable material, with the flanges, guide strips and pins being integrally formed. The cover 126 may be similarly formed, with the guide rails 150 affixed to or integral with the cover.

The dust cover plate 142 may be formed with a reinforcement feature to add strength and rigidity to the plate while allowing for minimal thickness. Thus, in one embodiment, the plate 142 may include reinforcement ribs 146 that extend across the width of the plate. In addition, the dust cover plate may be provided with recesses 147 that project inward toward the cover 126. The recesses 147 act as a sliding surface to facilitate translation of the dust cover plate 142 relative to the cover 126 and to prevent binding that might otherwise occur. The recesses 147 thus protrude slightly inward toward the cover 126. The cover may be provided with complementary channels within which the recesses are seated. The cover 126 may also be provided with reinforcement ribs, similar to the ribs 146 in the dust cover plate 142, to increase the rigidity of the portion of the cover that engages the dust cover plate.

Figure 6:
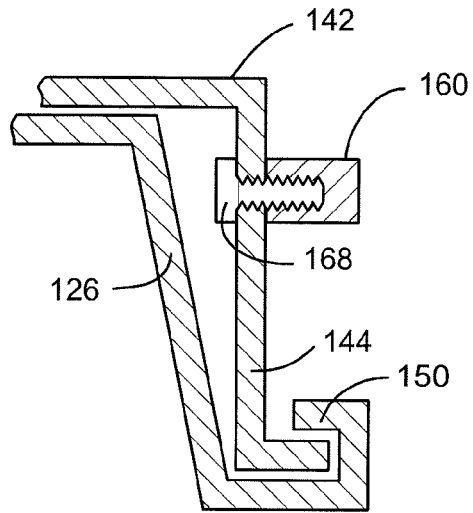
FIG. 6. is an enlarged side cross-sectional view of a lateral pin for the dust cover assembly disclosed herein.

In the embodiment illustrated in FIG. 4, the lateral pins 160 are shown affixed to or integral with the outer surface of the dust cover plate 142. An alternative configuration is shown in FIG. 6 in which the pins 160 are mounted to the side flanges 144 of the cover plate, such as by a fastener 168. The cover 126 may be modified to provide clearance for the fastener 168, as shown in FIG. 6. The post 160 is otherwise similar to the embodiment shown in FIG. 4 in that the post is engaged within the slot 166 to constrain the position of the dust cover plate 142.

Figure 7:
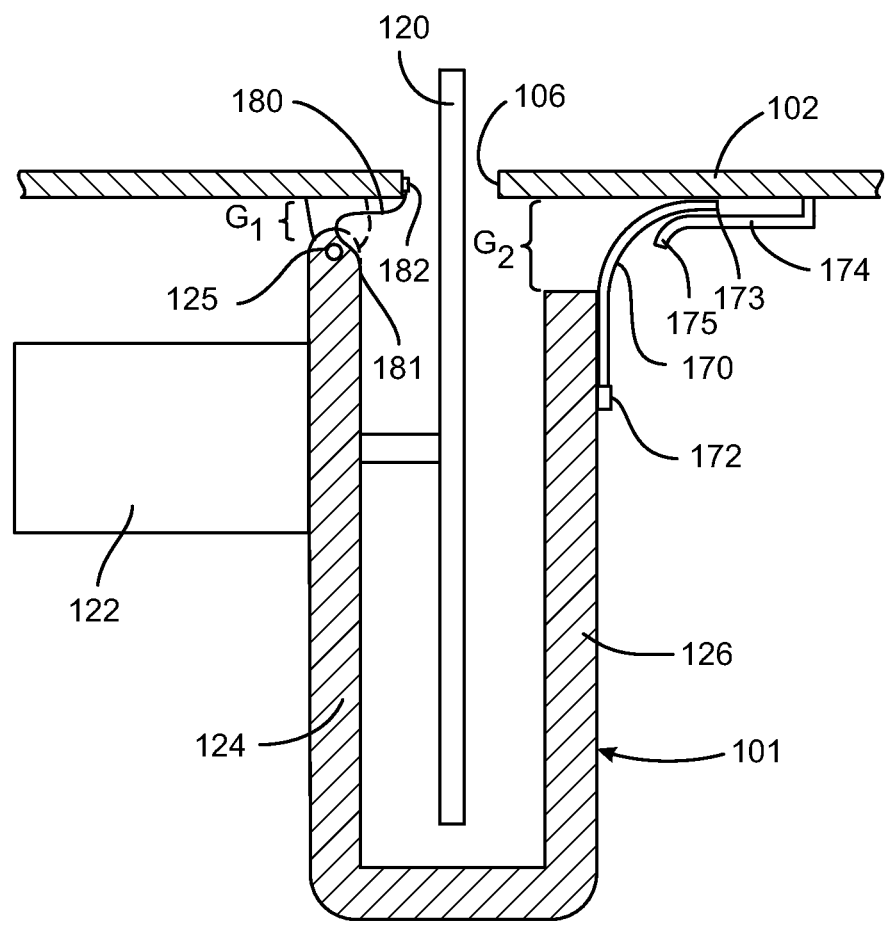
FIG. 7 is a side partial cross-sectional view of a dust cover assembly according to a further embodiment.

A dust cover configuration is shown in FIG. 7. On the cover 126 side of the blade assembly, a bendable sheet 170 is provided to span the gap G2. The sheet is engaged to the cover 126 at location 172 by conventional fastening techniques, such as by adhering, affixing or fastening the edge of the sheet to the outer surface of the cover. The opposite end 173 of the sheet is slidably disposed within a guide channel 174 extending below the underside of the table 102. The guide channel includes a curved entrance 175 and a length sufficient to accept the flexible sheet 170 when the blade assembly is pivoted to its maximum position, as represented in FIG. 5C. The sheet 170 is flexible or bendable so that it can bend at different locations along its length as the blade assembly is pivoted. However, the sheet is sufficiently rigid that it can hold its curved shape without buckling as the blade assembly is moving. The sheet 170 may be formed, for example, of a plastic material with adequate thickness to provide the requisite combination of bendability and stiffness. The stiffness of the sheet 170 not only allows the sheet to bend and translate without buckling, it also acts like a leaf spring to keep the sheet pressed against the cover 126 throughout the entire range of pivoting motion of the blade assembly, thereby preventing dust and debris from falling between the sheet 170 and cover 126.

A bendable sheet 180 may also be provided to span the gap G1 at the "motor side" of the blade assembly. One end of the bendable sheet 180 may be engaged to the carriage assembly 124 at location 181 adjacent the pivot mount 125, while the other end 182 may be engaged to the table 102, such as at the blade opening 106. The bendable sheet 180 may be engaged to the two components in a conventional manner, as described above. The sheet is preferably positioned inboard, meaning that it is within the blade opening 106, to contain the dust and debris. Like the sheet 170, the bendable sheet is both bendable and sufficiently stiff to avoid buckling. In addition, the sheet is "pre-bent" in a U-shape, as depicted in FIG. 7, so that the sheet will always face outward away from the blade 120 at any position of the blade assembly.

As shown in FIG. 2, the carriage assembly 124 defines a channel 128 at the motor side of the blade assembly. The motor 122 slides up and down within that channel to vary the prominence of the blade 120 above the surface of the table 102, resulting in variations of the depth of cut into the workpiece. While the channel provides an avenue for vertical adjustment of the blade, it also provides a path for dust and debris to escape the chamber 129 when the cutting blade 120 is operated. Thus, in another disclosed feature, the table saw 100 may incorporate a dust skirt assembly that moves with the motor 122 to cover at least an upper portion of the channel 128, even when the blade assembly 101 is pivoted.

Figure 8:
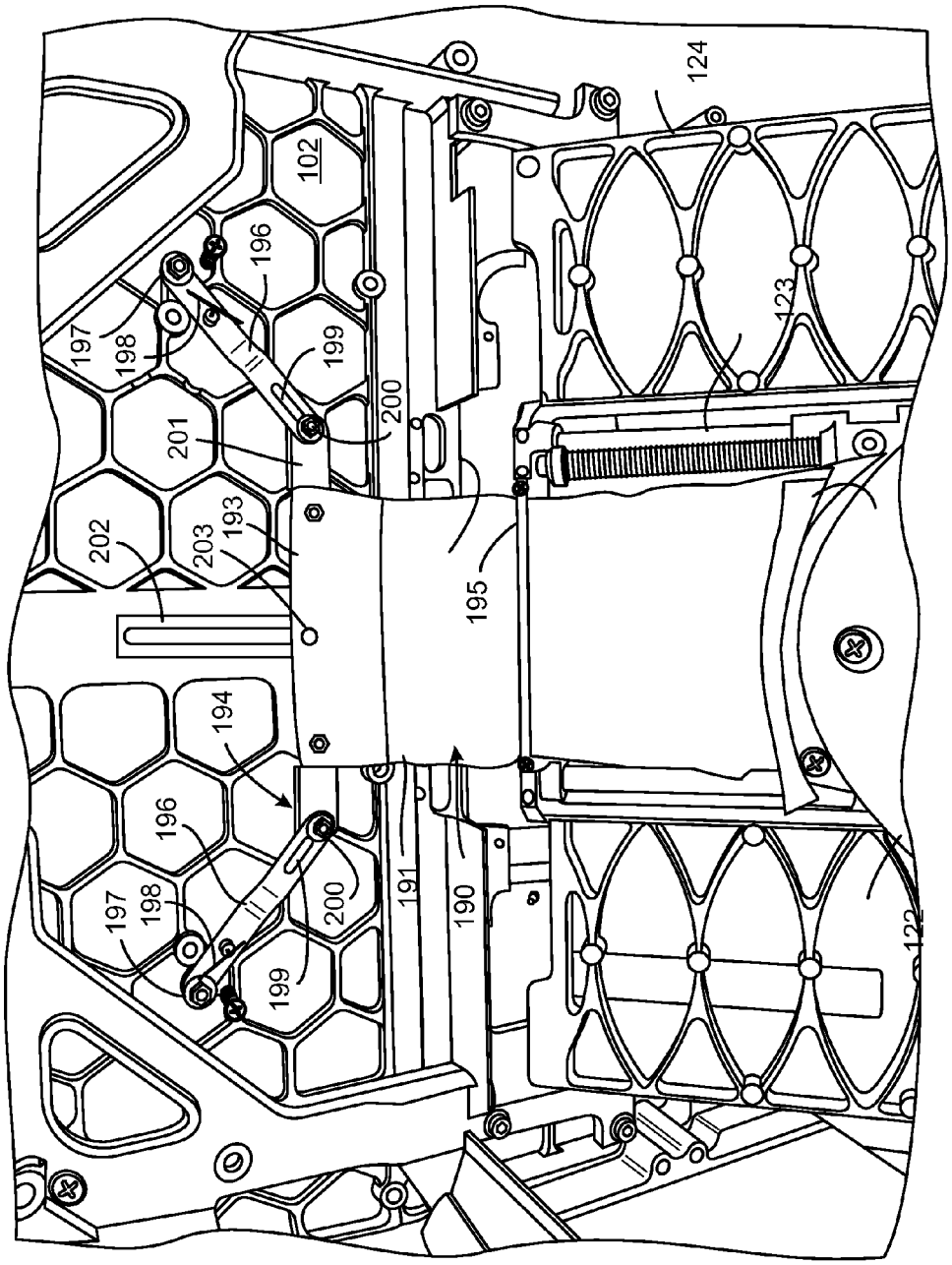
FIGS. 8-9 are views from the underside of a table saw showing a dust skirt assembly for the motor side of the blade assembly of the table saw with the blade at its lowermost position relative to the table.
Figure 9:
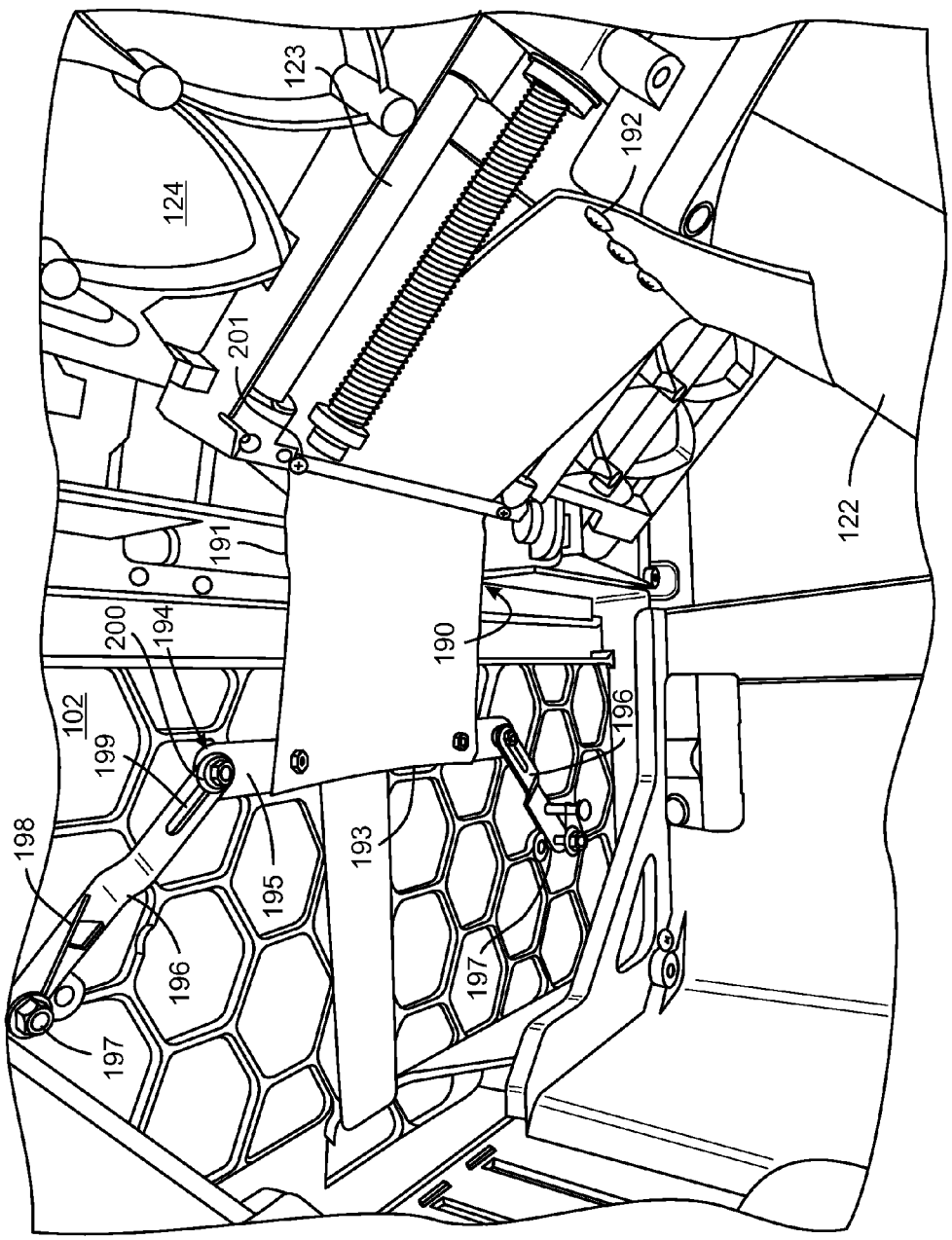

A view from the underside of the table 102 is provided in FIGS. 8 and 9, showing the carriage assembly 124 of the blade assembly and the motor 122 supported on the carriage assembly. Also shown is an adjustment mechanism 123 that is used to adjust the up and down position of the blade, as described above. As depicted in FIG. 8, this adjustment mechanism 123 includes a lead screw arrangement that can be rotated to provide fine adjustments of the blade position within the blade slot 106 (FIG. 2). A dust skirt assembly 190 is provided between the motor 122 and the underside of the table 102. The assembly 190 includes a flexible skirt 191 that is engaged at one end 192 to the motor 122. The end 192 may be engaged by conventional means, such as by adhering, clamping or fastening the end of the skirt to the motor 122 or structure associated and movable with the motor. The opposite end 193 of the flexible skirt 191 is engaged to a tensioning mechanism 194 that is operable to maintain the skirt in tension as it moves with the motor 122. The tensioning mechanism 194 includes a tension bar 195 that is associated with the carriage assembly 124 of the adjustment mechanism 123. The tension bar 195 is arranged adjacent the blade slot 106, as depicted in FIG. 8, and maintains that position even as the motor 122 translates within the channel 128 of the carriage assembly. The flexible skirt 191 is thus wrapped around the tension bar 195 so that the skirt is between the bar and the saw blade.

The tensioning mechanism 194 further includes a bar 195 to which the end 193 of the skirt is engaged. In the illustrated embodiment, the ends of the bar 195 are supported by links 196 that are pivotably mounted to the underside of the table 102 at pivot mounts 197. The links are biased to resist downward movement of the skirt with the motor 122 as the motor is moved toward the bottom of the channel 128. Thus, in one embodiment, the pivot mounts 197 include springs 198 that bias the links to pivot away from the carriage assembly 124, or more particularly away from the tension bar 195. The springs 198 may be hinge springs, as illustrated in FIG. 8, torsion springs, extension springs, or other suitable resiliently deformable element capable of providing a biasing force to the links 196. The links 196 are engaged to the bar 195 in a slotted engagement that permits variation of the distance from the bar 195 to the pivot mounts 197 as the dust skirt assembly is moved. Thus, in one embodiment the links 196 each include a slot 199 and the ends of the bar 195 include a post 200 configured to slide within the corresponding slot 199.

Figure 10:
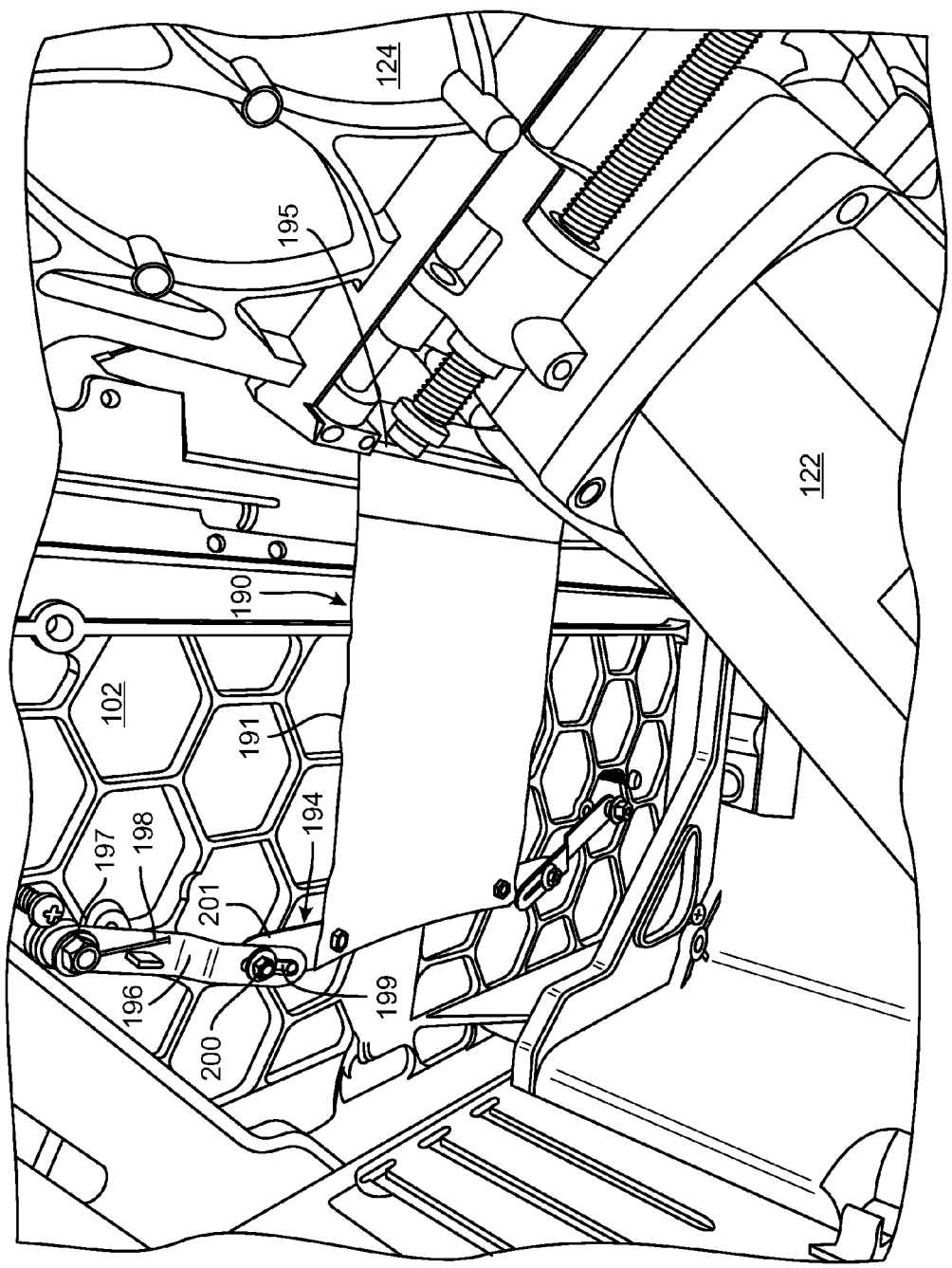
FIG. 10 is a view from the underside of the table saw showing the dust skirt assembly shown in FIGS. 8-9 with the blade in its uppermost position relative to the table.

The dust cover assembly 190 is shown in FIGS. 8 and 9 in its fully extended position, namely the position in which the motor 122 is at the bottom of the channel 128 and the blade is at its lowest or least prominent orientation relative to the table 102 and blade slot 106. FIG. 10 depicts the dust cover assembly 190 at its fully retracted position corresponding to the motor 122 being at the top of the channel 128 and the blade at its most prominent position above the table 102. It can be seen that the tensioning mechanism 194 has pulled the flexible skirt 191 away from the carriage assembly 124 while maintaining tension in the skirt against the tension bar 195. It can also be seen in comparing FIG. 8 with FIG. 10 that the post 200 has moved from one end of the slot 199 to the other as the links 196 are pivoted away from the carriage assembly and blade slot.

The tensioning mechanism 194 may incorporate a feature to ensure that the bar 195 translates uniformly as the skirt is extended and retracted. In particular, the mechanism may include a track 202 engaged to the underside of the table 102 generally at the midpoint of the bar 195. The bar includes a post 203, which may be a fastener used to hold the end 193 of the skirt 191 to the bar 195. The post 203 extends into the track 202 and rides within the rack as the flexible skirt assembly is operated to ensure that the skirt 191 does not skew to one side of another.

It can be appreciated that the extension and retraction of the flexible skirt 191 can occur at any angular orientation of the blade assembly 101. The blade assembly is depicted in FIGS. 8-10 in its fully pivoted position. The flexible skirt 191 is maintained in tension in part by the tension rod 195 which is fixed to the carriage assembly. Since the tension rod pivots with the carriage assembly it will always hold the skirt 191 in tension.

Figure 11:
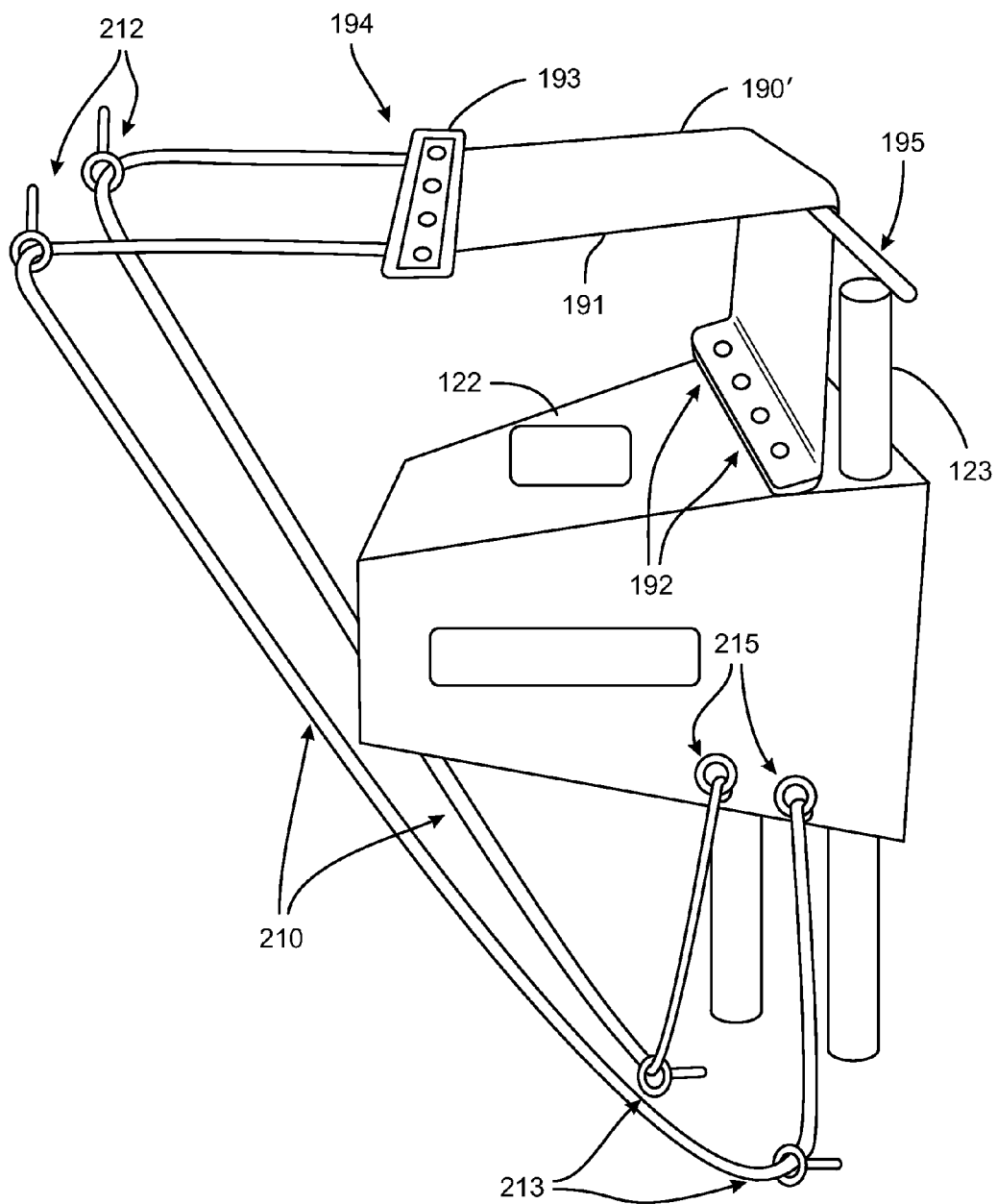
FIG. 11 is a side view of a motor assembly for a table saw including a dust skirt assembly according to a further embodiment.

A modified dust skirt assembly 190' is illustrated in FIG. 11. The assembly includes a dust skirt, such as the dust skirt 191 with one end 192 engaged to the motor 122, an opposite end 193 engaged to a tensioning mechanism 194' and a tension bar, such as the tension bar 195 described above. In this alternative, the tensioning mechanism 194' utilizes cables or wires 210 engaged to the one end 193 of the dust skirt 191 and engaged to the opposite side of the motor 122 at location 215. The wires 210 pass through sliding supports in the form of eyelets 212 engaged to the underside of the table and eyelets 213 engaged to the carriage assembly below the motor. The eyelets 213 are arranged so that the cables pass through the eyelets and engage the motor assembly with the cables running generally parallel to the direction of the up and down movement of the motor assembly along the adjustment mechanism 213. The cables are a fixed length, as is the dust skirt 191, so it can be appreciated that any up and down movement of the motor assembly 122 via the adjustment mechanism 123 will cause the wires and skirt to move in a loop, with the skirt constantly covering the channel in the carriage assembly. The wires 210 and/or the eyelets 212, 213 may incorporate a spring feature to ensure that the skirt 191 is maintained in tension during movement and to account for any stretching of the components over time.

The flexible skirt 191 may be formed of a variety of materials that are flexible enough to wrap around the tension bar 195 during extension and retraction and sufficiently strong to withstand contact from flying debris and dust. In one embodiment the skirt is formed of a tight mesh fabric, such as a nylon fabric. In an alternative embodiment the skirt may be formed of an elastically stretchable material so that the skirt is "self-tensioning". In this alternative the end 193 of the skirt 191 may be fastened directly to the underside of the table 102, in lieu of the tensioning mechanism 194. The skirt material can be adapted to stretch along its length without any significant reduction in width.

The devices and apparatuses described herein has been illustrated and described in detail in the figures and foregoing description, the same should be considered as illustrative and not restrictive in character. It is understood that only the preferred embodiments have been presented and that all changes, modifications, and further applications that come within the spirit of the device described herein are desired to be protected.

What is claimed is:

1. A power tool comprising:
   a table structure including a work surface and defining a blade slot;
   a frame supporting said table structure;
   a blade assembly including;
   a blade operably positioned within said blade slot;
   a motor assembly coupled to said blade to operate the blade; and
   a carriage assembly supporting said motor assembly and pivotably mounted relative to said table structure to adjust the angular orientation of said blade relative to said table structure, said carriage assembly defining a chamber within which said blade operates and a discharge chute for discharge of dust and debris during operation of said blade, said carriage assembly including a cover arranged to define a gap between an upper edge of said cover and the underside of the table structure in which the size of the gap varies as the carriage assembly pivots relative to the table structure; and
   a dust cover assembly including a cover element between said carriage assembly and said table structure and sized to substantially cover said gap at all angular orientations of said blade relative to said table structure, said cover element having one end mounted to said carriage assembly and an opposite end mounted to said table structure, at least one of said one end and said opposite end mounted for movement relative to the corresponding carriage assembly and table structure.

2. The power tool of claim 1, wherein said cover element is a cover plate mounted at said one end to said carriage assembly for relative translation thereto, said cover plate including an upper edge at said opposite end mounted to said table structure for relative pivoting thereto.

3. The power tool of claim 2, wherein said upper edge of said cover plate is mounted to said table structure for relative pivoting and translation thereto.

4. The power tool of claim 2, wherein said cover of said carriage assembly defines a pair of guide rails and said cover plate of said dust cover assembly includes opposite sides that are configured for sliding engagement within said guide rails.

5. The power tool of claim 2, wherein:
   said dust cover assembly further includes a pair of brackets mounted to the underside of said table structure, each defining an elongated slot; and
   said upper edge of said cover plate includes a pair of laterally disposed pins configured to slide and rotate within the slot of a corresponding bracket.

6. A power tool comprising:
   a table structure including a work surface and defining a blade slot;
   a frame supporting said table structure;
   a blade assembly including;
   a blade operably positioned within said blade slot;
   a motor assembly coupled to said blade to operate the blade; and
   a carriage assembly supporting said motor assembly and pivotably mounted relative to said table structure to adjust the angular orientation of said blade relative to said table structure, said carriage assembly defining a chamber within which said blade operates and a discharge chute for discharge of dust and debris during operation of said blade, said carriage assembly including a cover arranged to define a gap between an upper edge of said cover and the underside of the table structure in which the size of the gap varies as the carriage assembly pivots relative to the table structure, wherein said cover of said carriage assembly defines a pair of guide rails; and
   a dust cover assembly mounted between said carriage assembly and said table structure and sized to substantially cover said gap at all angular orientations of said blade relative to said table structure, said dust cover assembly mounted for movement relative to at least one of said carriage assembly and said table structure, wherein said dust cover assembly includes a cover plate having opposite sides that are configured for sliding engagement within said guide rails.

7. The power tool of claim 6, wherein said cover plate of said dust cover assembly is configured for a close sliding fit with said cover of said carriage assembly.

8. The power tool of claim 7, wherein said dust cover defines at least one recess in contact with said cover of said carriage assembly to provide a sliding surface between said cover and said cover plate.

9. The power tool of claim 6, wherein said cover plate includes at least one reinforcing rib.

10. The power tool of claim 1, wherein:
    said dust cover assembly includes a bendable sheet fixed at one of said one end and said opposite end to the corresponding one of said table structure and said carriage assembly; and
    the other of said table structure and said carriage assembly includes a guide channel within which the other of said one end and said opposite end of said bendable sheet is slidably disposed.

11. The power tool of claim 1, wherein:
    said carriage assembly includes a pivot mount opposite said gap, said pivot mount defining a second gap between said carriage assembly and said table structure; and
    said cover element is a bendable cover mounted between said carriage assembly and said table structure at said pivot mount.

12. The power tool of claim 11, wherein said bendable cover is bent into a U-shape.

* * * * *